US008983688B2

(12) United States Patent
Servantie et al.

(10) Patent No.: US 8,983,688 B2

(45) Date of Patent: Mar. 17, 2015

(54) DEVICE FOR DISPLAY AND CONTROL OF SETPOINTS FOR AUTOMATIC PILOTING FOR AIRCRAFT

(71) Applicant: Thales, Neuilly sur Seine (FR)

(72) Inventors: Xavier Servantie, Pessac (FR); Yannick Le Roux, St. Medard en Jalles (FR)

(73) Assignee: Thales, Neuilly sur Seine (FR)

( * ) Notice: Subject to any disclaimer, the term of this patent is extended or adjusted under 35 U.S.C. 154(b) by 67 days.

(21) Appl. No.: 13/783,148

(22) Filed: Mar. 1, 2013

(65) Prior Publication Data

US 2013/0231804 A1 Sep. 5, 2013

(30) Foreign Application Priority Data

Mar. 2, 2012 (FR) ..................................... 12 00628

(51) Int. Cl.

| | |
|---|---|
| ***G06F 19/00*** | (2011.01) |
| ***B64D 45/00*** | (2006.01) |
| ***G01P 1/08*** | (2006.01) |
| ***G01C 23/00*** | (2006.01) |

(52) U.S. Cl.

CPC . *B64D 45/00* (2013.01); *G01P 1/08* (2013.01); *G01C 23/005* (2013.01)

USPC ............................................................ 701/14

(58) Field of Classification Search

None

See application file for complete search history.

(56) References Cited

U.S. PATENT DOCUMENTS

| | | | |
|---|---|---|---|
| 6,081,256 | A | 6/2000 | Herget et al. |
| 2008/0125921 | A1 | 5/2008 | Baxter |
| 2011/0006983 | A1 | 1/2011 | Grothe |

OTHER PUBLICATIONS

French Search Report for Counterpart French Patent Application No. 1200628, 7 pgs. (Dec. 10, 2012).

*Primary Examiner* — Thomas Tarcza

*Assistant Examiner* — Garrett Evans

(74) *Attorney, Agent, or Firm* — Blakely, Sokoloff, Taylor & Zafman LLP

(57) ABSTRACT

The general field of the invention is that of devices for display and control of setpoints for automatic piloting for aircraft, configured to display the setpoints of speed, heading, climb slope and altitude. The various setpoints are displayed in the form of a graphical representation comprising: wheels graduated in speed and in altitude indicating the aircraft setpoint values; a circular heading rose, graduated and centered on a first symbol representing the aircraft, the heading setpoint being indicated by a second symbol representing the heading to be followed by the aircraft and disposed around the perimeter of the heading rose; and a vertical sectional view comprising a graduated semicircle centered on a third symbol representing the aircraft, the slope setpoint being indicated by a fourth symbol representing the slope to be followed by the aircraft and disposed around the perimeter of the semicircle.

7 Claims, 1 Drawing Sheet

PA 10 11 12 20 21 22 23 24 30 31 32 33 34 35 36 40 41 42

DEVICE FOR DISPLAY AND CONTROL OF SETPOINTS FOR AUTOMATIC PILOTING FOR AIRCRAFT

BACKGROUND OF THE INVENTION

1. Field of the Invention

The field of the invention is that of the control interfaces of aircraft automatic pilots.

2. Description of the Prior Art

Currently, on most aircraft, the interfaces of automatic pilots consist, as seen in FIG. 1, of control stations PC dedicated to this function. They comprise pusher control buttons BP or rotary control buttons BR and alphanumeric displays A showing the value of the various setpoints required for automatic piloting, that is to say the speed of the aircraft, its heading, its altitude and its ascent speed.

The interface operates in a simple manner. By means of the control buttons, the pilot sets the setpoints of speed, heading, altitude and climb slope, and then engages the modes of following of these setpoints.

This type of command is, however, the source of a certain number of errors with possible serious consequences for the aircraft. Thus, if the pilot sets a negative descent slope, whilst the setpoint altitude is greater than the current altitude, this causes the aircraft to perform the manoeuvre inverse to that envisaged and to follow a descent slope to the ground. When the pilot sets a heading setpoint, the pilot does not necessarily know on which side the aeroplane will turn, without knowing the current heading and viewing his position on the heading rose with respect to the setpoint heading. Of course, these errors remain rare, but they may have serious consequences.

The device according to the invention does not exhibit these drawbacks. It comprises a necessarily mere expressive graphical display of the setpoints than the display of the mere value of the setpoint. Thus the pilot more easily views the consequences of a setting on the behaviour of his aeroplane. The use of touchscreens makes it possible to facilitate interface with the system.

SUMMARY OF THE INVENTION

More precisely, the subject of the invention is a device for display and control of setpoints for automatic piloting for aircraft, the said device comprising a viewing screen configured to display at least the setpoints of speed, heading, climb slope and altitude of the aircraft, characterized in that the various setpoints are displayed in the form of a graphical representation comprising:

A first wheel graduated in speed and a second wheel graduated in speed, the first wheel indicating the setpoint speed of the aircraft in a coarse manner, the second wheel indicating the setpoint speed of the aircraft in a precise manner, the precision of the second wheel being about a decade greater than the precision of the first wheel;

A circular heading rose, graduated and centered on a first symbol representing the aircraft, the heading setpoint being indicated by a second symbol representing the heading to be followed by the aircraft and disposed around the perimeter of the heading rose;

A third wheel graduated in climb speed indicating the setpoint climb speed of the aircraft;

A vertical sectional view comprising a semicircle graduated in angle of slope centered on a third symbol representing the aircraft, the slope setpoint being indicated by a fourth symbol representing the slope to be followed by the aircraft and disposed around the perimeter of the semicircle;

A fourth wheel graduated in altitude and a fifth wheel graduated in altitude, the fourth wheel indicating the setpoint altitude of the aircraft in a coarse manner, the fifth wheel indicating the setpoint altitude of the aircraft in a precise manner, the precision of the fifth wheel being about a decade greater than the precision of the fourth wheel.

Advantageously, the graphical representation comprises an indication of the time required for the aircraft to attain one of the setpoints of speed, heading, climb slope or altitude of the aircraft.

Advantageously, the graphical representation comprises an indication of the current altitude and/or of the current speed.

Advantageously, the graphical representation comprises push-buttons making it possible to decrease or to increase the values of setpoints of speed, heading, climb slope and altitude of the aircraft.

Advantageously, the graphical representation comprises an option making it possible to reveal a numerical keypad making it possible to enter a value of setpoint of speed, heading, climb slope and altitude of the aircraft.

Advantageously, the viewing screen is a touchscreen arranged so as to allow at least one rotation of the graduated wheels and a displacement of the second symbol and of the fourth symbol.

BRIEF DESCRIPTION OF THE DRAWINGS

The invention will be better understood and other advantages will become apparent on reading the nonlimiting description which follows and by virtue of the appended figures among which.

DETAILED DESCRIPTION

The device for display and control of setpoints for automatic piloting for aircraft according to the invention comprises a viewing screen configured to display at least the setpoints of speed, heading, climb slope and altitude of the aircraft. The various setpoints are displayed in the form of a graphical representation relying on three technical principles which are the following:

- Represent graphically the envisaged trajectory of the aircraft;
- Propose graphical setting of the various parameters of the automatic pilot;
- Provide the estimation of the time to reach the setpoint.

The graphical and operational implementation by the aircraft's avionics system of the display device according to the invention requires only technical adaptations within the scope of the person skilled in the art.

More precisely, the graphical representation must comprise at least the following elements:

- The heading indication is represented by a view in a horizontal sectional plane of the situation. It comprises the current heading and the setpoint heading of the aircraft. The time to reach the setpoint heading can be indicated;
- The altitude setpoint and the climb slope are represented by a vertical sectional view representing the progress of the aeroplane and comprising a representation of the envisaged slope and of the envisaged altitude.

This presentation makes it possible to rapidly identify inconsistent parameters such as, for example, a positive climb slope to an altitude below the altitude of the aeroplane. Thus, the pilot has a clear indication of what the automatic pilot intends to do. it is certain that the right setpoint has been indicated.

The graphical setting of the values of the setpoints can be done by means of graphical representation of graduated wheels, of push-buttons or of rotary buttons. It possible to use the conventional computerized interfaces to designate, modify and validate these values. The graphical pointers associated with control means, called CCD for "Cursor Control Device", will be cited by way of example. It is possible to also use a touchscreen configured to authorize any action with the fingers making it possible to modify the setpoints such as those to rotate the graduated wheels in a virtual manner, to implement the control buttons or to displace graphical symbols representing the future position of the aircraft. The graphical representation can comprise an option making it possible to reveal a numerical keypad making it possible to enter a value of setpoint of speed, heading, climb slope and altitude of the aircraft. It is understood that the conventional digital setting is preserved in this type of presentation.

The estimation of the time to reach a particular setpoint can be given at two moments. It can be provided before the application of the setpoint by the pilot so that the pilot can anticipate the behaviour of the aircraft. It can be provided after the application of the setpoint.

Figure 1:
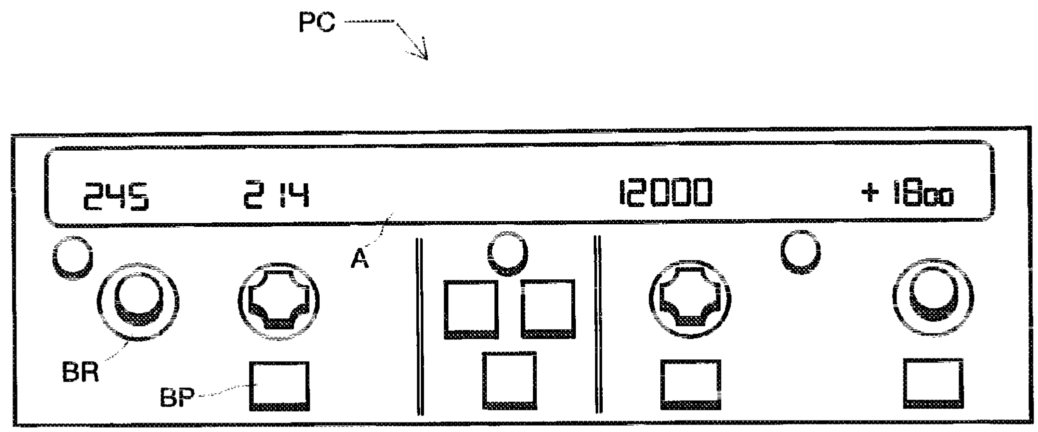
FIG. 1 represents an automatic pilot interface according to the prior art.
Figure 2:
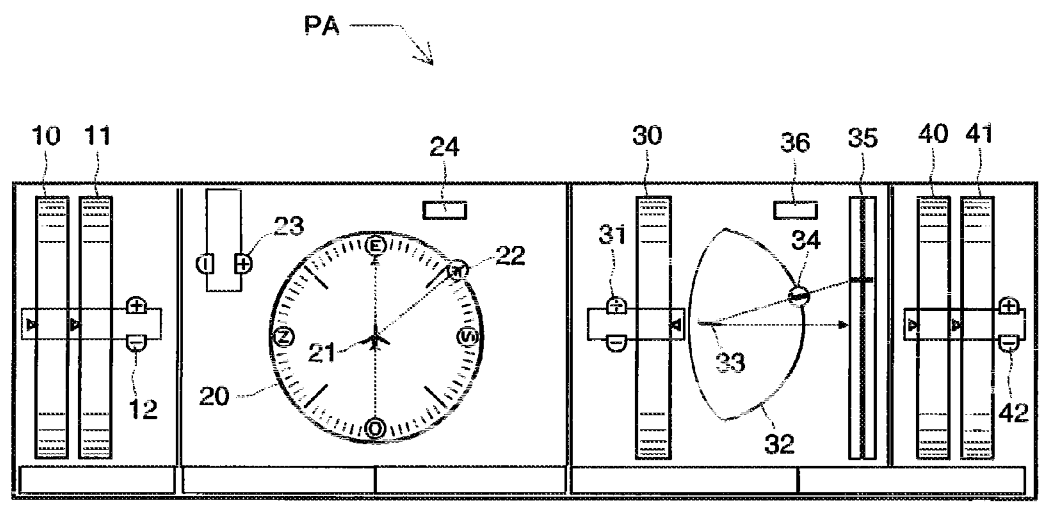
FIG. 2 represents an automatic pilot interface according to the invention.

By way of nonlimiting example, FIG. 2 represents an automatic pilot graphical interface PA according to the invention. It comprises, starting from the left of FIG. 2 and going right, four zones.

A first zone is reserved for the display of the speed setpoints. This first zone comprises a first wheel 10 graduated in speed and a second wheel 11 also graduated in speed, the first wheel 10 indicating the setpoint speed of the aircraft in a coarse manner, for example in steps of 10 knots, the second wheel 11 indicating the setpoint speed of the aircraft in a precise manner, for example in steps of 1 knot. Generally, a decade separates the precision of these two wheels. Push-buttons 12 marked "+" and "−" make it possible to increment the setpoint speed.

A second zone is reserved for the display of the heading setpoints. This second zone comprises a circular heading rose 20, graduated and centered on a first symbol 21 representing the aircraft and marked with the four cardinal points, the heading setpoint being indicated by a second symbol 22 representing the heading to be followed by the aircraft and disposed around the perimeter of the heading rose. The heading rose can be supplemented with arrows or needles representing the current heading and the future heading. Push-buttons 23 marked "+" and "−" make it possible to increment the setpoint heading. The indication 24 of the time to reach the heading setpoint is also indicated.

A third zone is reserved for the display of the setpoints of vertical speed. This third zone comprises a third wheel 30 graduated in climb speed indicating the setpoint climb speed of the aircraft, push-buttons 31 marked "+" and "−" make it possible to increment the setpoint climb speed and a vertical sectional view comprising a semicircle 32 graduated in angle of slope centered on a third symbol 33 representing the aircraft, the slope setpoint being indicated by a fourth symbol 34 representing the slope to be followed by the aircraft and disposed around the perimeter of the semicircle. This sectional view can be supplemented with arrows or needles representing the current slope and the setpoint slope. The third zone also comprises an altitude scale 35 indicating the current altitude and the setpoint altitude of the aircraft. The indication 36 of the time to reach the altitude setpoint is also indicated.

Finally, a fourth zone is reserved for the display of the altitude setpoints. This fourth zone comprises a fourth wheel 40 graduated in altitude and a fifth wheel 41 graduated in altitude, the fourth wheel indicating the setpoint attitude of the aircraft in a coarse manner, for example in steps of 1000 feet, the fifth wheel indicating the setpoint altitude of the aircraft in a precise manner, for example in steps of 100 feet. Generally, a decade separates the precision of these two wheels. On these wheels are recalled the current altitude of the aircraft by means of a mark which may be a horizontal line for example. The push-buttons 42 marked "+" and "−" make it possible to increment the setpoint altitude.

The graphical representation according to the invention allows simpler interpretation of the setpoints of the automatic pilot and reduces the risks of error. It is well suited to the use of touchscreens.

What is claimed is:

1. A device for display and control of setpoints for automatic piloting for an aircraft, the device comprising:

a computerized visual display configured to display at least setpoints of speed, heading, climb speed, climb slope and altitude of the aircraft, wherein the setpoints are displayed in a graphical representation comprising:

a first wheel graduated in speed and a second wheel graduated in speed, the first wheel indicating the setpoint of speed of the aircraft in a coarse manner, the second wheel indicating the setpoint of speed of the aircraft in a precise manner, the precision of the second wheel being about a decade greater than the precision of the first wheel;

a circular heading rose, graduated and centered on a first symbol representing the aircraft, the setpoint of heading being indicated by a second symbol representing a heading to be followed by the aircraft and disposed around a perimeter of the heading rose;

a third wheel graduated in climb speed indicating the setpoint of climb speed of the aircraft;

a vertical sectional view comprising a semicircle graduated in angle of slope centered on a third symbol representing the aircraft, the setpoint of climb slope being indicated by a fourth symbol representing a climb slope to be followed by the aircraft and disposed around a perimeter of the semicircle;

a fourth wheel graduated in altitude and a fifth wheel graduated in altitude, the fourth wheel indicating the setpoint of altitude of the aircraft in a coarse manner, the fifth wheel indicating the setpoint of altitude of the aircraft in a precise manner, the precision of the fifth wheel being about a decade greater than the precision of the fourth wheel.

2. The device for display and control of setpoints for automatic piloting for an aircraft according to claim 1, wherein the graphical representation comprises an indication of a time required for the aircraft to attain at least one of the setpoints of speed, heading, climb speed, climb slope or altitude of the aircraft.

3. The device for display and control of setpoints for automatic piloting for an aircraft according to claim 1, wherein the graphical representation comprises an indication of a current altitude.

4. The device for display and control of setpoints for automatic piloting for an aircraft according to claim 1, wherein the graphical representation comprises an indication of a current speed.

5. The device for display and control of setpoints for automatic piloting for an aircraft according to claim 1, wherein the graphical representation comprises one or more push-buttons to decrease or to increase one or more values of at least one of the setpoints of speed, heading, climb speed, climb slope and altitude of the aircraft.

6. The device for display and control of setpoints for automatic piloting for an aircraft according to claim 1, wherein the graphical representation comprises an option to reveal a numerical keypad to enter one or more values of at least one of the setpoints of speed, heading, climb slope and altitude of the aircraft.

7. The device for display and control of setpoints for automatic piloting for an aircraft according to claim 1, wherein the computerized visual display is a touchscreen that is configured to allow at least one of a rotation of the graduated wheels, a displacement of the second symbol, and a displacement of the fourth symbol.

* * * * *